United States Patent [19]
Walker

[11] 4,195,786
[45] Apr. 1, 1980

[54] APPARATUS FOR REMOVAL OF SILAGE FROM A SILO

[76] Inventor: Alfred Walker, Stuttgarter Strasse 38, D-7141 Schwieberdingen, Fed. Rep. of Germany

[21] Appl. No.: 942,710

[22] Filed: Sep. 15, 1978

[30] Foreign Application Priority Data

Sep. 28, 1977 [DE] Fed. Rep. of Germany ....... 2743602

[51] Int. Cl.² ............................................ B02C 18/26
[52] U.S. Cl. ................................ 241/101.7; 241/277; 241/283
[58] Field of Search ............................... 414/313, 318; 241/101.7, 101 A, 101.5, 191, 186 R, 186 A, 186.1, 186.2, 277, 283, DIG. 17, 205

[56] References Cited

U.S. PATENT DOCUMENTS

| 2,705,597 | 4/1955 | Erickson ....................... 241/186 R X |
| 3,121,488 | 2/1964 | Chittock ............................ 241/101.5 |
| 3,578,183 | 5/1971 | Larger ............................... 414/318 X |
| 3,920,190 | 11/1975 | Kanengieter et al. ........ 241/101.7 X |

*Primary Examiner*—Mark Rosenbaum

[57] ABSTRACT

A silage removal cutter is mounted on a frame having a vertical end wall. The cutter extends over the width of the frame and is movable up and down in front of its end wall. The end wall has a central chute in which is arranged a conveyor directed perpendicular to the end wall. The cutter is provided in front of the chute with cutting and hurling blades and feed screws or worms are arranged on both sides of the cutter means which serve to transport the cut-off silage toward the cutting and hurling blades.

18 Claims, 3 Drawing Figures

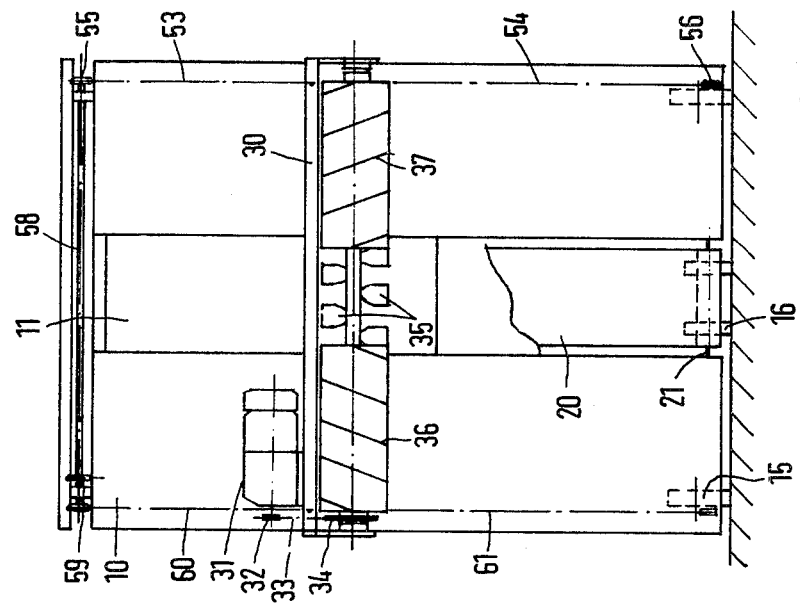
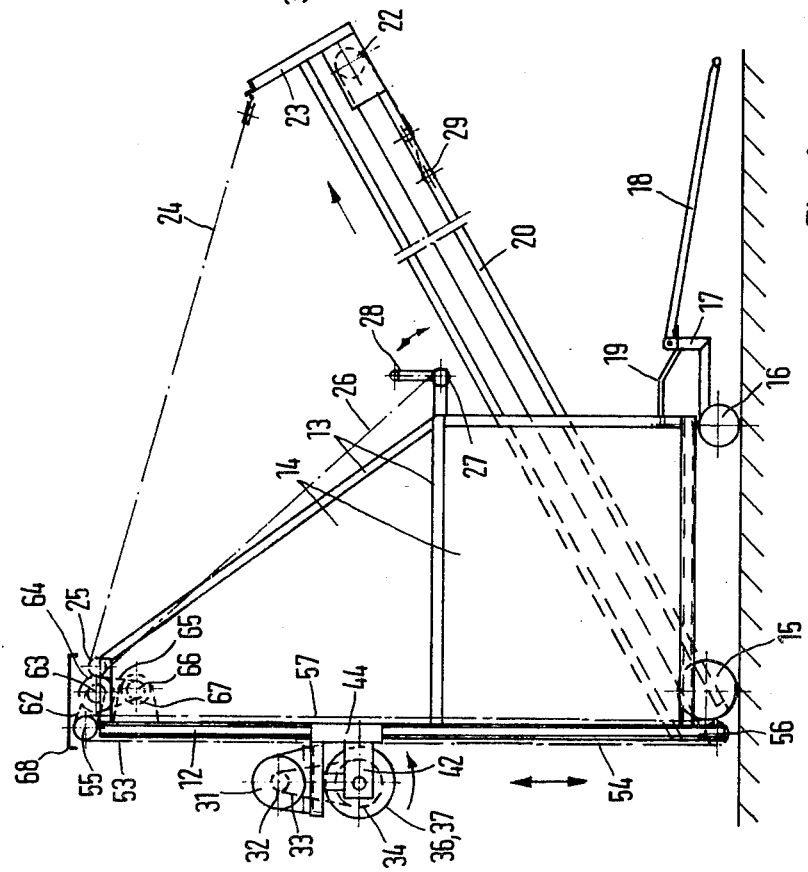

APPARATUS FOR REMOVAL OF SILAGE FROM A SILO

BACKGROUND OF THE INVENTION

The invention relates to an apparatus for the removal of silage from a silo and more particularly to a rotary hoe type cutter which is mounted on a frame so as to be displaceable vertically and having a conveyor for withdrawal of the cut-off silage.

Devices of this kind are known, which can be hitched to the power take-off of a tractor as accessory equipment, the power take-off driving the cutter means.

These known arrangements are not satisfactory in use because they require frequent assembly and disassembly. The tractor must repeatedly be coupled to the apparatus and uncoupled again when several truckloads of silage have been removed from the silo. Besides in known devices the cutter means is designed as a cutter head which is additionally moved back and forth horizontally over the width of the implement frame. For this reason the capacity of such an apparatus is low. Also, with such an apparatus, the conveyor extends crosswise in the lower region of the end wall, so that the cut-off silage emerges at the side of the apparatus. This is unfavorable for direct loading of a truck.

SUMMARY OF THE INVENTION

It is the principal object of the invention to provide silage removal apparatus of the above-mentioned kind so that a much higher capacity is obtained and that the cut-off silage can be supplied in a simple manner directly to a truck to be loaded.

According to the invention, this problem is solved in that the cutter means extends over the total width of the implement frame and is movable up and down in front of the latter's vertical end wall, that the end wall is designed in the central region as a chute having arranged therein a conveyor means directed perpendicular to the end wall, and that the cutter means is provided in front of the chute with cutting and hurling blades, feed screws or worms being arranged on both sides of the cutter means which serve to transport the cut-off silage toward the cutting and hurling blades. With this design of the cutter means a layer of silage is cut off simultaneously over the total width of the implement frame and is forcibly supplied to the chute disposed in the center of the end wall containing the conveyor means. The conveyor means in the chute conveys the cut-off silage out of the apparatus, so that a truck standing in front of the apparatus can be loaded directly.

For vertical guiding of the cutter means on the implement frame according to one variant of the invention, the cutting and hurling blades and the cutting and feed screws are arranged on a continuous shaft, which is rotatably mounted at its ends on fishplates, and that these fishplates carry sliding blocks which are guided for vertical displacement in U-shaped guide rails of the implement frame. The guide rails stiffen the outer edges of the end wall, and the open seating of the guide rails are directed outwardly so that they do not come in contact with the silage and the latter does not impair the sliding movement of the blocks.

According to another variant, the drive of the cutter means is arranged so that the two fishplates are interconnected by means of a beam, an electric motor is secured on the beam, a drive gear is serurely fixed on the driving shaft of the motor, a driven gear is secured fixedly on the shaft of the cutter means, and the drive gear and driven gear are coupled through a drive chain. The cutter means thus constitutes an autonomous unit, so that the power take-off drive of a tractor can be dispensed with. The set-up times of known devices are thus obviated.

For better suspension of the common shaft of the cutter means, it is preferred that the ends of the shaft are rotatably mounted in bearings fixed on the fishplates.

In order to insure that the bearings of this shaft will not impair the cutting process, it is provided according to a further embodiment that the fishplates are arranged in off-set manner toward the center of the cutter means, and that the cutting and feed screw terminates in the end regions on its circumference in cutting elements which span the associated bearing of the shaft. The terminal transport elements of the screws assure that the silage layer is removed in front of the cutter means and is supplied to the chute.

In order that the silage will be removed also in the region of the drive chain from the drive gear of the motor to the driven gear on the common shaft of the cutter means, the drive chain is provided with cutting and transport elements which engage over the drive chain and the driven gear with its bearing bushing, conveying the cut-off silage on to the adjacent cutter and feed screw.

Naturally the shaft of the cutter means can be driven at one or at both ends.

The vertical displacement of the cutter means is achieved according to a further variant of the invention in that the cutter means, in particular the beam thereof, is connected at both ends with drive loops passed over guide pulleys, that one guide pulley each is provided in the region of the upper and lower edge of the end wall, and that one drive loop each is disposed in the region of the longitudinal edges of the end wall, also that the two upper guide pulleys are secured fixedly on a common shaft mounted on the implement frame, and that this shaft carries additionally a driven gear which is coupled by a drive chain, intermediate gears and another drive chain with the drive gear of an electric motor. The vertical movement of the cutter means can then be limited or respectively reversed through limit switches known per se.

According to yet another variant, the design of the conveyor means is such that as conveyor means a conveyor belt is used whose width is matched with the width of the chute, that this conveyor belt is pivotably suspended through one of its guide shafts in the region of the end wall and in the lower region of the chute, and that the conveyor belt protrudes obliquely upward out of the chute away from the end wall and is adjustable in its inclination relative to the base of the implement frame by means of a cable and drum. The inclination of the conveyor belt can thus be adapted to the height of the truch to be loaded. On the side remote from the end wall of the frame, the conveyor belt is cantilevered from the apparatus far enough so that the truck to be loaded can be placed under it conveniently.

Since the apparatus must be shifted after the removal of a layer of silage, the implement frame is preferably wheelable and at least some of the wheels can be selectively locked and released. This is further facilitated by the fact that some of the wheels are disposed on a steering frame with a drawbar, and that these wheels can be locked and released through a drawbar-controlled linkage.

BRIEF DESCRIPTION OF THE DRAWINGS

The invention will be explained in greater detail with reference to the embodiment illustrated in the drawings.

FIG. 1 shows the apparatus in side elevational view.

FIG. 2 is a front view of the apparatus and shows cutter means and the end wall with the chute.

DESCRIPTION OF THE PREFERRED EMBODIMENT

Figure 3:
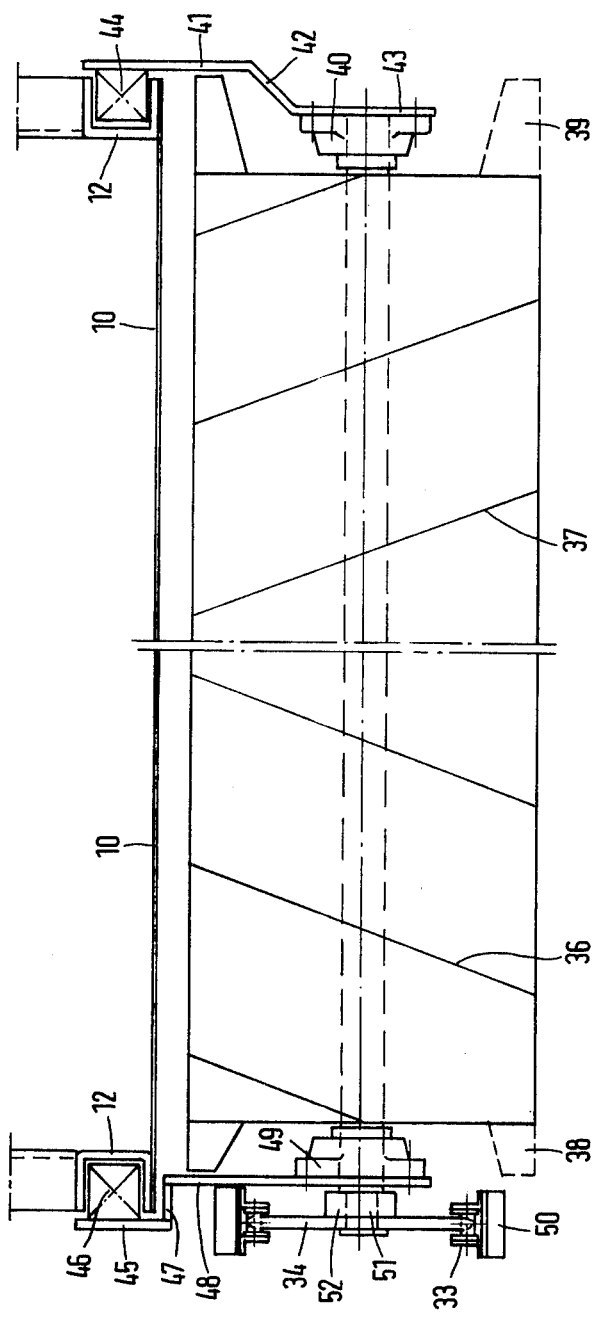
FIG. 3 is an enlarged top plan view of the cutter means supported for vertical displacement.

FIGS. 1 and 2 show the apparatus in two views from which the most important parts thereof can be seen. The apparatus is constructed with a closed end wall 10 which is to confront the silage block to be cut off. In the central region of the front end wall there is provided a chute 11 extending vertically and defined by side sheets 14 and covering sheets.

At both outer edges of the end wall 10 are provided vertical guide rails 12 which have their tracks or channels directed outwardly and serve to guide the cutter means in vertical up and down movements. The end wall 10, side sheets 14 and covering sheets of the apparatus are secured to the implement frame, which consists preferably of a framework of beams 13. The entire apparatus is wheelable upon wheels 15 and 16 mounted in the base area. The two wheels 15 are rotatable at the lower corners of the end wall 10, while the two wheels 16 are mounted as part of a steering member 17. Steering member 17 includes a drawbar 18 which is articulated so as to control a linkage 19. This linkage 19 actuates a brake lock for the wheels 15, so that they are released when drawbar 18 is raised, while they are locked when drawbar 18 is lowered. Thereby the apparatus may be driven to the silage block and can be secured at such location so that it does not move away from the silage block during cutting.

The cutter means comprises a continuous shaft 51 extending across the total width of the end wall 10. In the area in front of the chute 11, shaft 51 carries cutting and hurling blades 35, which extend radially and are staggered on shaft 51 and overlap in the longitudinal direction of shaft 51. Upon rotation of shaft 51 in the direction of the arrow according to FIG. 1, these cutting and hurling blades 35 cut off the silage and hurl the cut-off silage into chute 11. On both sides of chute 11 cutter and feed screws 36 and 37 are disposed on shaft 51 which simultaneously convey the cut-off silage toward chute 11. The apparatus thus operates over the total width of the cutter means and forcibly feeds the cut-off silage to chute 11 arranged in the center.

In chute 11 a conveyor belt is arranged as transport means 20 so that one guide shaft 21 in the bottom area of chute 11 and in the plane of the end wall 10 serves at the same time as pivot axis for the vonveyor belt and for wheels 16. The conveyor belt extends upwardly from chute 11 directed obliquely so that the truck to be loaded can easily be placed under it. The lower section of the conveyor belt is covered by a protective band carried by supporting rollers 29.

The conveyor belt is matched in width to the width of chute 11, and in the area of the other guide shaft 22 it is suspended in support 23 by means of a cable line 24. Cable line 24 is passed over the guide pulley 25 and cable line 26 extends to the cable drum 27, which can be driven in both directions by means of the manual winch 28. In this manner the inclination of the conveyor belt can easily be varied and adapted to the height of the truck to be loaded.

For the cutter means to remove a layer of silage from the silage block, it must be displaceable vertically. To this end, as in FIG. 3, the ends of shaft 51 are rotatably mounted in bearings 40 and 49. These bearings 40 and 49 are secured on fishplates 43 and 48. These fishplates 43 and 48 are bent inwardly at an angle so that the shaft ends do not project laterally beyond the end wall 10. These angular portions 42, 27 are such that the ends 41 and 45 of the fishplates 43 and 48 overlie the channels of the guide rails 12. The ends 41 and 45 of the fishplates 43 and 48 carry parallelepipedal sliding blocks 44 and 46, which are displaceable vertically in the channels of the guide rails 12. The two fishplates 43 and 48 are interconnected by means of beam 30. Beam 30 carries an electric motor 31 on whose drive shaft a drive gear 32 is fixedly secured. The adjacent end of shaft 51 fixedly carries driven gear 34 which is coupled with the driving gear 32 through the drive chain 33. Therefore, the drive of the cutter means is autonomous and is displaced vertically with the cutter means. Naturally, the shaft 51 of the cutter means can be driven thus at both ends. The drive chain 33 carries slanting conveyor elements 50 which remove the layer of silage in front of the drive chain and convey it to the adjacent cutter and feed screw 36. In order that the silage layer will be removed also in the area of the fishplates 43 and 48, the cutter and feed screws 36 and 37 extend beyond the bearings 40 and 49 and are provided with silage transport elements 38 and 39 which are arranged only in the area of the axial periphery of the cutter and feed screws 36 and 37 so as to assure that the silage is cut from the silage block before it reaches or might interfere with the bearings 40 and 49. Thereby cutting takes place actually over the entire width of the end plate 10, i.e. of the apparatus, the silage layer is cut off and the entire cut-off silage is conveyed to the center of the apparatus, where it is then hurled into the chute 11 by the blades 35. The silage hurled into chute 11 falls onto the conveyor belt 20 and is transported out of the apparatus in the direction of the arrow in FIG. 1.

Beam 30 is suspended on the implement frame by means of two drive loops. Chain members 53 and 60 carry beam 30 on the outside of end wall 10. The cable lines 54 and 61 continue over the lower guide pulleys 56 on the back of the end wall 10, as reference symbol 57 indicates, and are connected with the chain members 53 and 60 via the upper guide pulleys 55, e.g. sprocket wheels. The sprocket wheels 55 are secured fixedly on shaft 58. Shaft 58 carries a driven wheel 59, which is driven via the drive chain 62, the intermediate gears 63 and 64 on an intermediate shaft and the drive chain 65 by the drive gear 66 of an electric motor 67. This electric motor 67 is controlled through limit switches known in themselves and disposed on either the guide rails 12 or the implement frame, in such a way that the cutter means runs from the top position to the bottom position guided within rails 12. The electric motor 67 is then reversed in its direction of rotation so that the cutter means is raised again to the top position. The electric motor is then switched off and the apparatus is ready for a new cutting operation. First, however, the apparatus must be moved closer to the silage block again so that upon lowering of the cutter means a new layer of silage is removed.

In the vertical displacement of the cutter means the sliding blocks 44 and 46 and the two drive loops assure untilted guiding. The drive loops may alternatively be designed completely as drive chains. In this case also the lower guide pulleys 56 are formed as sprocket wheels.

The cover plate 68 covers the motor 67 and the associated drive means for the vertical displacement of the cutter means.

I claim:

1. Apparatus for the removal of silage from a silo comprising:
   a vehicular frame having a front end;
   a vertically disposed rectangular planar wall stationarily mounted on the front end of said frame;
   a chute formed along a vertical line centrally of said front end wall;
   drum-cutter means extending in front of said front end wall across the entire width thereof, means for mounting said drum-cutter means to reciprocate vertically along said front wall at a fixed distance from the surface thereof, said cutter means comprising rotatable cutting and hurling blades positioned in general alignment with said chute and rotatable cutter and feed screws located along a common axis with and on both sides of said cutting and hurling blades, said cutter and feed screws being oppositely arranged to cooperate with the surface of said wall to convey cut-off silage inwardly into proximity with said cutting and hurling blades; and
   conveyor means located behind said wall and in alignment with said chute extending rearwardly substantially perpendicular to said front end wall for conveying cut-off silage away from said chute.

2. Apparatus according to claim 1, wherein said frame includes a pair of vertically extending U-shaped rails adjacent said wall at its lateral edges.

3. Apparatus according to claim 2, wherein said rails are carried by said end wall and reinforce the lateral edges thereon.

4. Apparatus according to claim 2 or 3, wherein said cutting and hurling blades and said cutter and feed screws are carried by a continuous shaft, a pair of fishplate members rotatably supporting the ends of said shaft, and slide blocks carried by said fishplates for vertical displacement within said rails.

5. Apparatus according to claim 4, including a beam extending transversely of said wall and carrying said fishplates adjacent the ends thereof, an electric motor with a drive shaft supported by said beam, the drive shaft of said motor having drive means thereon, said continuous shaft being cooperable with said motor shaft drive means so as to be drivable thereby.

6. Apparatus according to claim 5, including sprockets carried by said motor drive shaft and said continuous shaft and a drive chain coupling said sprockets.

7. Apparatus according to claim 6, including cutter elements on said drive chain adapted to convey silage cut off to the adjacent cutter and feed screw.

8. Apparatus according to claim 5, including flexible drive means for supporting said beam on said frame for vertical displacement relative thereto.

9. Apparatus according to claim 8, including guide pulleys carried by said frame adjacent upper and lower edges of said front end wall and flexible drive loops connected between said pulleys.

10. Apparatus according to claim 9, including a common shaft mounted rotatably in said frame and carrying a pair of said guide pulleys thereon in axially spaced relation, drive means fixedly carried by said shaft and motor means carried by said frame operably connected with the drive means of said shaft for the driving of said shaft.

11. Apparatus according to claim 10, wherein the drive means on said common shaft is a sprocket wheel and said motor and shaft drive means are operably connected by means of a sprocket wheel and drive chain arrangement.

12. Apparatus according to claim 4, including bearings on said fishplates for rotatably supporting said continuous shaft.

13. Apparatus according to claim 4, 5, 6, or 12, wherein said fishplates are formed with sections offset inwardly from the lateral edges of said wall, said continuous shaft being rotatably supported by said offset sections.

14. Apparatus according to claim 12, including cutter elements carried peripherally at the outer axial ends of said cutter and feed screws, said cutter elements extending axially beyond said bearings to thereby provide for removal of silage in front of said fishplates.

15. Apparatus according to claim 1, wherein said conveyor means comprises a conveyor belt having a width corresponding substantially to the width of said chute, one end of said conveyor belt being carried rotatably and pivotably by an axle mounted adjacent the base of said frame and the other end of said conveyor belt being carried rotatably by a support member, said support member being carried by said frame by a cable and drum arrangement whereby said conveyor belt can be pivoted about said axle for positioning at a desired angular relationship with the horizontal to thereby establish an elevation for the conveyor belt to permit a vehicle to be stationed there beneath to receive cut-off silage from said conveyor belt for transport to a remote location.

16. Apparatus according to claim 15, including wheels rotatably carried by said frame for movement thereof towards or away from the silo and releasable brake means for said wheels, at least one set of said wheels being carried by the axle pivotably and rotatably carrying said conveyor belt.

17. Apparatus according to claim 1, including wheels rotatably carried by said frame for movement thereof towards or away from the silo and releasable brake means for said wheels.

18. Apparatus according to claim 17 or 16, including a steering member for said frame, said steering member including a drawbar and articulated linkage arrangement, said linkage having an element releasably engageable with at least one of the wheels for selectively braking same.

* * * * *